United States Patent
Surber, III

(10) Patent No.: US 10,302,231 B2
(45) Date of Patent: May 28, 2019

(54) FLEXIBLE JOINT ASSEMBLY FOR HIGH OR LOW TEMPERATURE FLUID SYSTEMS

(71) Applicant: Exotic Metals Forming Company LLC, Kent, WA (US)

(72) Inventor: William B. Surber, III, Seattle, WA (US)

(73) Assignee: Exotic Metals Forming Company LLC, Kent, WA (US)

( * ) Notice: Subject to any disclaimer, the term of this patent is extended or adjusted under 35 U.S.C. 154(b) by 235 days.

(21) Appl. No.: 15/208,559

(22) Filed: Jul. 12, 2016

(65) Prior Publication Data

US 2017/0016562 A1    Jan. 19, 2017

Related U.S. Application Data

(60) Provisional application No. 62/191,859, filed on Jul. 13, 2015.

(51) Int. Cl.
| | |
|---|---|
| F16L 27/11 | (2006.01) |
| F16L 59/21 | (2006.01) |
| F16L 27/073 | (2006.01) |
| F16L 51/02 | (2006.01) |
| F16L 59/14 | (2006.01) |

(52) U.S. Cl.
CPC ............. *F16L 27/11* (2013.01); *F16L 27/073* (2013.01); *F16L 51/025* (2013.01); *F16L 51/026* (2013.01); *F16L 59/14* (2013.01); *F16L 59/21* (2013.01)

(58) Field of Classification Search
CPC ....... F16L 27/11; F16L 51/025; F16L 51/026; F16L 51/027; F16L 59/14; F16L 59/21

USPC ............... 285/53, 49, 48, 226, 227
See application file for complete search history.

(56) References Cited

U.S. PATENT DOCUMENTS

| | | | | |
|---|---|---|---|---|
| 3,997,194 A | * | 12/1976 | Eifer ........................ | C21B 7/16 110/182.5 |
| 4,023,782 A | * | 5/1977 | Eifer ....................... | F16L 51/02 266/186 |
| 4,047,740 A | * | 9/1977 | Young ................... | F16L 51/025 285/226 |
| 4,668,303 A | * | 5/1987 | Weber ..................... | F16L 51/02 134/22.13 |

(Continued)

FOREIGN PATENT DOCUMENTS

| | | |
|---|---|---|
| DE | 2442708 B1 | 10/1975 |
| DE | 102012216097 A1 | 3/2014 |

(Continued)

OTHER PUBLICATIONS

International Searching Authority, International Search Report and Written Opinion, PCT Application PCT/US2016/041945, dated Oct. 24, 2016, 13 pages.

(Continued)

*Primary Examiner* — Aaron M Dunwoody
(74) *Attorney, Agent, or Firm* — Perkins Coie LLP

(57) ABSTRACT

A flexible joint assembly is disclosed for use in an extreme temperature fluid flow system. In an embodiment, the flexible joint assembly can be used in a fluid flow system configured to carry high temperature fluid, such air or other gas, and/or in a fluid flow system configured to carry low temperature fluid, such air or other gas.

20 Claims, 13 Drawing Sheets

(56) References Cited

U.S. PATENT DOCUMENTS

| | | | | |
|---|---|---|---|---|
| 4,746,148 A * | 5/1988 | Perkins | F16L 27/111 | 285/114 |
| 5,346,263 A * | 9/1994 | Huzenlaub | F16L 51/026 | 285/226 |
| 5,506,376 A * | 4/1996 | Godel | F01N 13/1816 | 181/208 |
| 6,354,632 B1 * | 3/2002 | Jung | F01N 13/1811 | 285/226 |
| 6,464,257 B1 * | 10/2002 | Cwik | B21C 37/20 | 285/227 |
| 6,568,715 B2 * | 5/2003 | Cwik | F01N 13/1816 | 285/299 |
| 6,631,928 B1 * | 10/2003 | Sakata | F16L 27/1085 | 285/226 |
| 6,669,912 B1 * | 12/2003 | Udell | F01N 3/2839 | 422/179 |
| 6,902,204 B2 * | 6/2005 | Atanasoski | F01N 13/1811 | 285/226 |
| 9,631,751 B2 * | 4/2017 | Kim | F16L 27/111 | |
| 2003/0150502 A1 * | 8/2003 | Nagai | F01N 13/1816 | 138/121 |
| 2005/0000206 A1 * | 1/2005 | Simon | F01N 13/14 | 60/272 |
| 2008/0012297 A1 * | 1/2008 | Heil | F01N 13/1816 | 285/226 |
| 2011/0074147 A1 * | 3/2011 | Thomas | F01N 13/143 | 285/226 |
| 2012/0056414 A1 * | 3/2012 | Thomas | F01N 13/143 | 285/49 |
| 2013/0015652 A1 * | 1/2013 | Thomas | F01N 13/1816 | 285/47 |
| 2015/0076814 A1 * | 3/2015 | Lucky | F01N 13/143 | 285/226 |
| 2015/0084328 A1 * | 3/2015 | Kampfe | F01N 13/14 | 285/48 |
| 2016/0003388 A1 * | 1/2016 | Barbely | F16L 27/1004 | 285/226 |
| 2016/0195207 A1 * | 7/2016 | Fernandes | F16L 27/111 | 285/226 |
| 2018/0195139 A1 * | 7/2018 | Mutschler | C21B 7/20 | |

FOREIGN PATENT DOCUMENTS

| | | |
|---|---|---|
| EP | 1055807 A2 | 11/2000 |
| FR | 2409442 A1 | 6/1979 |
| FR | 2823284 A1 | 10/2002 |

OTHER PUBLICATIONS

International Searching Authority, International Preliminary Report on Patentability, PCT Application PCT/US2016/041945, dated Jan. 25, 2018, 8 pages.

* cited by examiner

FLEXIBLE JOINT ASSEMBLY FOR HIGH OR LOW TEMPERATURE FLUID SYSTEMS

CROSS-REFERENCE TO RELATED APPLICATION(S)

This non-provisional patent application claims the benefit of and priority to U.S. Provisional Patent Application No. 62/191,859, titled Flexible Joint Assembly for High or Low Temperature Fluid Systems, and filed Jul. 13, 2015, which is incorporated herein in its entirety by reference thereto.

TECHNICAL FIELD

This patent application is directed to joint assemblies for fluid flow systems, including flexible joint assemblies for gas flow systems configured to carry high pressure and/or temperature gas.

BACKGROUND

Aircraft often will distribute hot air or gas generated from an engine, through one or more duct systems to other areas or systems in the aircraft. The hot gas can elevate the operating temperatures of the duct system, which can result in substantive thermal expansion and/or contraction of the system during operation. Fluid flow systems carrying low temperature fluid can experience similar thermal expansion. There is a need for joints in the high and/or low temperature gas flow systems that will accommodate or otherwise allow for the thermal expansion/contraction of the system over the life of the system.

SUMMARY

A flexible joint assembly in accordance with one or more embodiments of the present technology overcomes drawbacks of the prior art and provides other benefits. At least one embodiment provides a flexible joint assembly configured to interconnect tube segments of an extreme temperature gas flow system. The flexible joint assembly comprising a pair of opposing standoffs axially spaced apart and separated from each other by a gap. Each standoff has proximal and distal end portions, and the proximal end portion of each standoff is connectable to a respective one of the tube segments. A pair of inner flow liners coaxially aligned with and coupled to the proximal end portion of a respective one of the standoffs. Each inner flow liner being radially inward or and separated from at least a portion of the respective standoff to define an annular space therebetween. Insulation is in the annular space between each inner flow liner and the respective one of the standoffs. A bellows member is coupled to the distal end portion of each standoff and spans the gap between the opposing standoffs. The bellows member is configured to allow the pair of standoffs to move angularly relative to each other relative to a longitudinal axis of the assembly. An inner race is coupled to a first one of the standoffs adjacent to a first end of the bellows member. An outer race is coupled to a second one of the standoffs adjacent to a second end of the bellows member. At least one of the inner and outer races has an arcuate bearing surface. A bearing portion is between the inner and outer races and configured to engage the bearing surface at least when the first and second standoffs move angularly relative to each other.

In one embodiment, the insulation can span the gap between the standoffs. The insulation can comprise a plurality of layers. The bellows can cover at least a portion of the insulation. The inner flow liner can be attached to the proximal end portion of each standoff. The bellows assembly comprises a gusseted portion that allows the first and second standoffs to move angularly relative to each other through a range approximately +/−5 degrees. The outer race can have a retainer portion engaging the bearing and retaining the bearing in engagement with the bearing surface. Each inner low liner can have a first end portion coupled to the proximal end portion of the respective one of the standoffs and a second end portion radially inward of the distal end portion of the respective one of the standoffs, the first end portion can have a first diameter larger than a second diameter of the second end portion. The bellows member can have a first end portion captured between the outer race and the distal end portion of a first one of the standoffs, and the bellows member can have a second end portion captured between the inner race and the distal end portion of a second one of the standoffs. The arcuate bearing surface can be a partially spherical bearing surface.

In another embodiment, a flexible joint assembly comprises a pair of opposing standoffs axially spaced apart and separated from each other by a gap. Each standoff is connectable to a respective one of the tube segments. A pair of inner flow liners are coupled to the standoffs. Each of the inner flow liners is coaxially aligned with and coupled to a respective one of the standoffs. Insulation is between at least a portion of each inner flow liner and the respective one of the standoffs. A bellows member is coupled to each standoff and spans the gap between the opposing standoffs. The bellows member is configured to allow the pair of standoffs to move angularly relative to each other and relative to a longitudinal axis of the assembly. An inner race is coupled to a first one of the standoffs adjacent to a first end of the bellows member. An outer race is coupled to a second one of the standoffs adjacent to a second end of the bellows member, wherein at least one of the inner and outer races having an arcuate bearing surface. A bearing is between the inner and outer races and in engagement with the bearing surface at least when the first and second standoffs move angularly relative to each other.

Another embodiment provides a flexible joint assembly comprising tubular first and second standoffs axially spaced apart from each other and each having distal and proximal end portions. The distal end portions generally facing each other and form an axial gap between the standoffs. The proximal end portion of the first standoff is configured to connect to the first gas line, and the proximal end of the second standoff configured to connect to the second gas line. The first and second standoffs are movable angularly relative to each other. A first inner flow liner is fixedly attached to the proximal end portion of the first standoff, and a second inner flow liner is fixedly attached to the proximal end portion of the second standoff. The first and second inner flow liners are axially adjacent to each other with an annular space between the first and second inner flow liners and the distal end portions of the first and second standoffs. One insulation layers are in the annular space and span the axial gap between the first and second standoffs. A bellows member is connected to the distal end portions of the first and second standoffs. The bellows member spans the axial gap between the first and second standoffs and covers at least a portion of the one or more insulation layers. An annular inner race is attached to a first end of the bellows assembly or to the first standoff, and the inner race has a first bearing surface facing radially away from the bellows assembly. An outer race is attached to the second end of the bellows assembly or to the second standoff, and the outer race has a second bearing surface facing radially toward the first bearing surface of the inner race. A bearing is between the first and second bearing surfaces, and is slidably engaged with at least one of the first or second bearing surfaces of the outer and inner races when the first and second standoffs move angularly relative to each other.

Another embodiment provides a flexible joint assembly that comprises tubular standoffs that each have distal and proximal end portions. The distal end portion has a larger diameter than the proximal end portion, and the distal end portions are configured to generally face each other and form an axial gap between the standoffs. An inner flow liner is attachable to the interior surface of the proximal end portion of a respective one of the standoffs. The inner flow liner and the interior surface of the distal end portion of the standoff are configured to form an annular space between them, and one or more insulation layers are in the annular space. The insulation layers are configured to span the axial gap between standoffs. A bellows assembly is coupled to the exterior surfaces of the distal end portions of the standoffs. The bellows assembly is configured to span the axial gap between standoffs and cover a portion of the insulation layers. An annular inner race is attachable to one end of the bellows assembly or to one standoff. The inner race has a bearing surface configured to face radially away from the bellows assembly. An outer race is attachable to the other end of the bellows assembly or to the other standoff. The outer race has a bearing surface configured to face radially toward the bearing surface of the inner race and configured to form an area between them. A bearing is positionable in the area configured to form between the bearing surfaces of the outer and inner races, and the bearing is slidably engageable with at least one of the bearing surfaces of the outer and inner races.

Another embodiment provides a method of using a high or low temperature fluid flow system with a flexible joint assembly. The method comprises using tubular standoffs each having distal and proximal end portions, wherein the distal end portion has a larger diameter than the proximal end portion. The distal end portions are generally facing each other and form an axial gap between the standoffs. The method also includes attaching an inner flow liner to an interior surface of the proximal end portion of a respective one of the standoffs, wherein the inner flow liner and the interior surface of the distal end portion of the standoff form an annular space between them. The method includes positioning one or more insulation layers in the annular space between the inner flow liner and the interior surface of the distal end portion of the standoff. The insulation layers spans the axial gap between standoffs. The method includes attaching a bellows assembly to the exterior surfaces of the distal end portions of the standoffs. The bellows assembly spans the axial gap between the standoffs and covers a portion of the insulation layers. The method includes attaching an annular inner race to one end of the bellows assembly or to one standoff, wherein the inner race has a bearing surface facing radially away from the bellows assembly. The method includes attaching an outer race to the other end of the bellows assembly or to the other standoff, wherein the outer race has a bearing surface facing radially toward the bearing surface of the inner race and forming an area between them. The method includes positioning a bearing in the area between the bearing surfaces of the outer and inner races, wherein the bearing slidably engaged with at least one of the bearing surfaces of the outer and inner races. The assembled tubular standoffs, inner flow liner, insulation layers, bellows assembly, annular inner race, outer race, and bearing form the flexible joint assembly through which a high or low temperature fluid flows.

BRIEF DESCRIPTION OF THE DRAWINGS

Embodiments of a flexible joint assembly for use in a high-temperature or low-temperature fluid system in accordance with the present technology introduced herein may be better understood by referring to the following Detailed Description in conjunction with the accompanying drawings, in which like reference numerals indicate identical or functionally similar elements.

Figure 1:
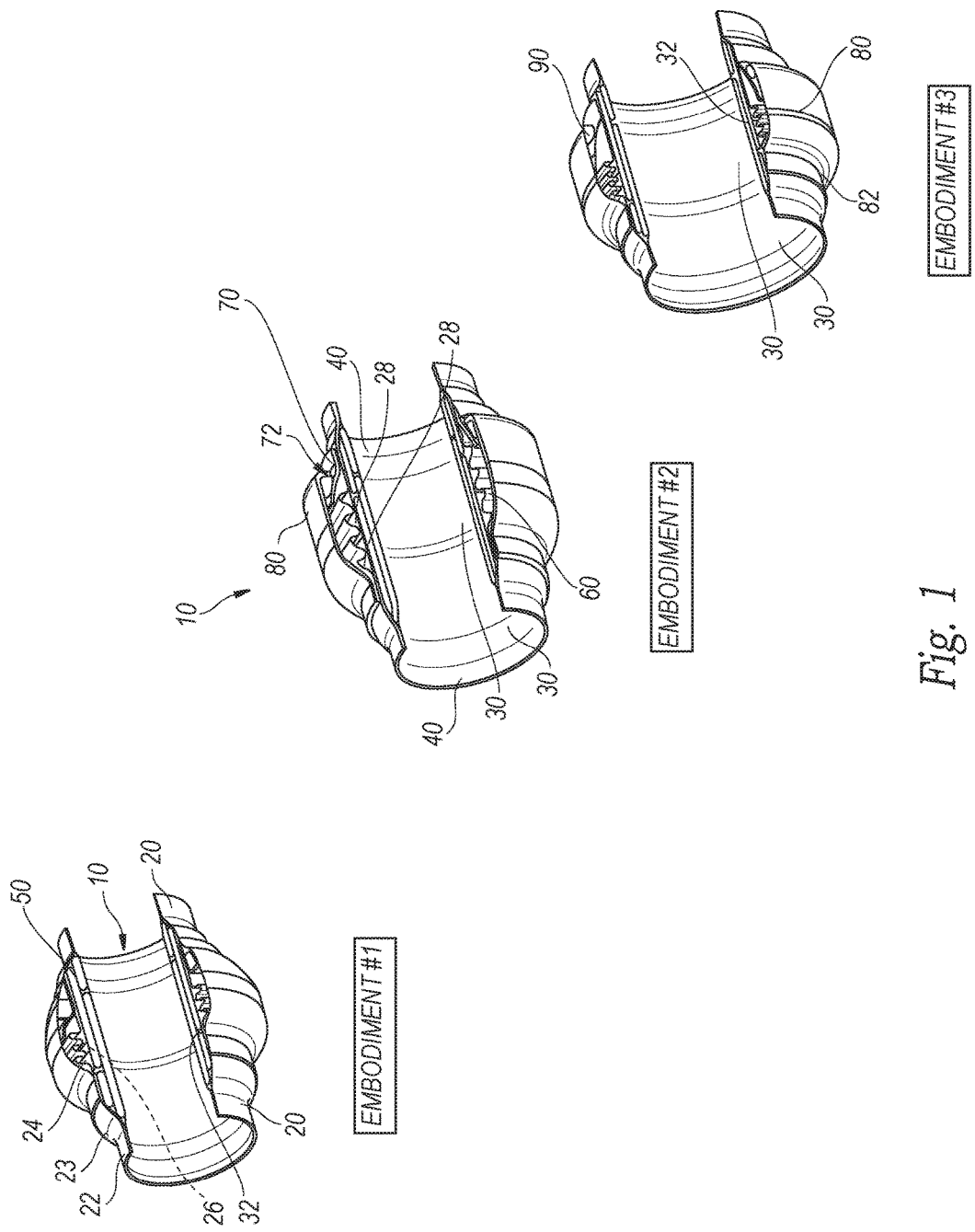
FIG. 1 show partially cut away isometric views of flexible joint assemblies in accordance with embodiments of the present technology.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments as defined by the appended claims.

DETAILED DESCRIPTION

Overview

A flexible joint assembly is disclosed for use in an extreme temperature fluid flow system. In an embodiment, the flexible joint assembly can be used in a fluid flow system configured to carry high temperature fluid, such air or other gas, and/or in a fluid flow system configured to carry low temperature fluid, such air or other gas.

General Description

Various examples of the flexible joint assembly introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Flexible joint assemblies configured for use in extreme temperature gas flow systems in accordance with embodiments of the present technology are discussed below. The flexible joint assemblies of the illustrated embodiments are configured for high temperature air flow systems, such as the systems used in connection with an aircraft engine bleed system that carries hot air from the engine to other areas or systems in the aircraft via a series of interconnected metal ducts and associated joint assemblies. The duct system can include high pressure portions capable of carrying heated air with temperatures in the range of approximately 100° F.-1400° F., inclusive, at elevated pressures, such as in the range of approximately 50 psig-2500 psig, inclusive. The flexible joint assemblies can be used with other duct systems that carry high or low temperature materials that may cause thermal expansion or contraction of components of the duct system.

FIG. 1 shows embodiments of the flexible joint assembly 10 that comprises a pair of spaced apart, coaxially aligned, tubular standoffs 20 with a proximal end portion 22 configured to be welded or otherwise sealably attached to the tubular end portion of a duct segment. Each standoff 20 has a shoulder portion 23 extending radially between the proximal end portion 22 and a distal end portion 24, such that the distal end portion 24 has a larger diameter than the proximal end portion 22. An inner flow liner 30 is positioned within each standoff 20 and defines an interior surface of the flexible joint assembly 10 that contacts the hot air or other gas flowing therethrough and between duct segments. The inner flow liner 30 is welded or otherwise sealably attached to the proximal end portion 22 of its respective standoff 20. In at least one embodiment (shown in FIG. 1 as Embodiment #2 configured for use in a high pressure portion of a duct system), a support band 40 is attached to the end of the inner flow liner 30 at the proximal end portion 22 of the standoff 20. Other embodiments (i.e., Embodiments #1 and #3) do not include or need the support bands 40.

The inner flow liners 30 have a substantially constant diameter, such that there is an annular space 32 between the inner flow liner 30 and the distal end portion 24 of the standoff 20. In the illustrated embodiment, the standoffs 20 are arranged in a coaxially aligned configuration with the distal end portions 24 facing each other. In illustrated Embodiments #1 and #3, the distal end portions 24 are substantially immediately adjacent to each other with a relatively small axial gap 26 between them. In Embodiment #2, the gap between the adjacent distal end portions 24 is larger, and an outer liner 28 is welded or otherwise sealably fixed to the respective one of the distal end portions 24, such that the ends of the outer liners 28 are immediately adjacent to each other with a relatively small axial gap therebetween.

The joint assembly 10 has one or more insulation layers 50 positioned radially outward of the inner flow liners 30 and within the annular space 32 between the inner flow liner 30 and the distal end portion 24 of the standoff 20. The joint assembly 10 has two or more segmented, radially overlapping insulation layers 50, such that portions of the insulation layers span across the gap 26 between the adjacent distal end portions 24 of the standoffs 20. The insulation layers 50 can be made of a flexible insulation blanket with Min-K® encapsulated between cloths and with a Quartz F182 cloth facing on the hot side (i.e., facing the inner flow liners 30). A bellows assembly 60 is positioned over the distal end portions 24 of the aligned standoffs 20, such that the bellows assembly 60 covers a portion of the insulation layers 50 and spans the gap 26 between the standoffs 20. The bellows assembly 60 has a corrugated middle portion 62 located between end portions 64, and each end. End portion 64 is welded or otherwise sealably attached to a respective one of the standoffs 20 at its distal end portion 24. The bellows assembly 60 is configured to flex at the corrugated middle portion 62 so as to allow the two standoffs 20 to move angularly relative to each other. In the illustrated embodiment, the flexible joint assembly and is configured to flex angularly through a range of approximately +/−5 degrees, inclusive relative to the longitudinal axis of the joint assembly 10 in an unflexed position.

The joint assembly 10 has an annular inner race 70 welded or otherwise fixed to one of the end portions 64 of the bellows assembly 60 and/or to the distal end portion 24 of the corresponding standoff 20. The inner race 70 has a bearing surface 72 facing radially away from the bellows assembly 60. In the illustrated embodiment, the bearing surface 72 is a partially spherical bearing surface. The joint assembly 10 has an outer race 80 with a support collar 82 on the proximal end welded or otherwise fixed to the other end portion 64 of the bellows assembly 60 and/or the distal end portion 24 of the other standoff 20. The free distal end 84 of the outer race 80 has a contoured retainer portion 86 positioned radially outward of the inner race 70 and adjacent to the bearing surface 72. In the illustrated embodiments, a self-lubricating graphite bearing 90 is attached to or otherwise captured by the retainer portion 86 and in slideable engagement with the spherical bearing surface 72 of the inner race 70. The graphite bearing 90 is configured to allow the inner and outer races 70 and 80 to move relative to each other with reduced frictional resistance to the movement and the associated articulation by the bellows assembly 60.

The joint assembly 10 provides a fully sealed, leak-proof joint between duct members. The insulation layers 50 help shield the bellows assembly 60, the inner and outer races 70 and 80, and the distal portions 24 of the standoffs 20 from the elevated temperatures of the air or other fluid flowing through the joint assembly. Accordingly, the exterior surface of the joint assembly 10 remains meaningfully cooler than the high temperature of the fluid (i.e., up to approximately 1400° F.) flowing through the joint assembly 10, while still allowing some flexure and/or angular movement within the joint assembly, such as may be needed to help accommodate for thermal expansion or contraction of the duct members to which the joint assembly 10 is fixedly attached. The graphite bearing helps in providing low bending moments in the joint assembly throughout the operational life of the flexible joints. Endurance testing results, discussed below, show no bearing degradation, bearing wear, or increase in bending moments during the testing process. While the illustrated embodiments utilize the self-lubricating graphite bearings, other bearing configurations may be used in other embodiments. For example, the joint assembly 10 can include coated metal races configured to experience wear in a thin exterior surface coating over time at acceptable levels.

As discussed above, the flexible joint assembly of the illustrate include the following assembly components: bellows assembly 60, bearing 90, outer race or retainer 80, standoffs 20, bands (Embodiment #2) 40, liners (flow, inner, or outer) 30, inner race 70, support collar 82, and insulation 50. Other embodiments can include additional or fewer components, depending upon the design requirements and environmental conditions anticipated during use of the joint assembly 10 over its life.

The flexible joint assemblies of the illustrated embodiments can include the following characteristics identified in Table 1 (below).

TABLE 1

High Temperature Flexible Joint Assemblies

| Design Characteristic | Embodiment #1 | Embodiment #2 | Embodiment #3 |
|---|---|---|---|
| Mating Duct Reference Outer Diameter | 3.50 inches | 4.00 inches | 6.00 inches |
| Material | Nickel alloy | Nickel alloy | Nickel alloy |
| Overall Length | 6.660 inches | 7.260 inches | 7.585 inches |
| Shroud Outer Diameter | 5.745 inches | 6.24 inches | 8.38 inches |
| Nominal Joint Weight | 3.48 lbs | | 8.34 lbs |
| Joint Weight | 3.48 lbs-3.84 lbs | 7.36 lbs-8.10 lbs | 8.34 lbs-9.18 lbs |
| Internal Flow Velocity (either direction) | 0.0 to 0.3 Mach | 0.0 to 0.3 Mach | 0.0 to 0.3 Mach |

Figure 2:
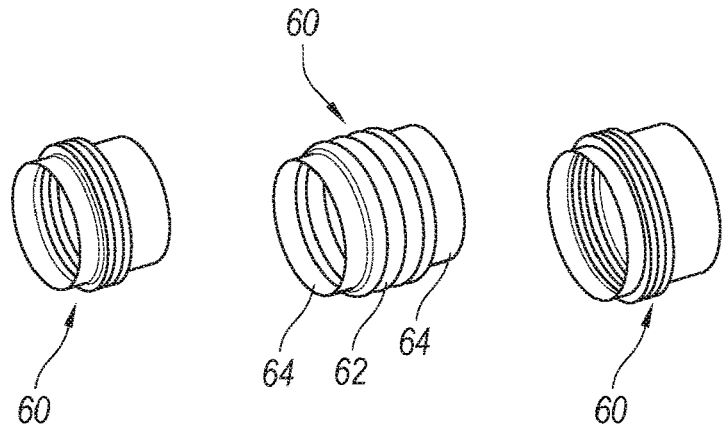
FIG. 2 show isometric views of bellow assemblies of the flexible joint assemblies of FIG. 1.

FIG. 2 illustrates isometric views of the bellow assemblies 60 shown removed from the flexible joint assemblies 10. The illustrated bellows assembly 60 are made of Nickel alloy 718 coil with a thickness in the range of approximately 0.006"-0.010", inclusive. Other embodiments can use other suitable materials and or other dimensions. The bellows assemblies 60 of the illustrated embodiments have a plurality of ribs or gussets axially adjacent to each other that allow for axial expansion and/or contraction of the respective bellows assembly 60. As seen in FIG. 2, Embodiment 1 has three gussets space closely adjacent to each other when in a generally contracted position so as to allow the bellows assembly 60 to axially expanded toward an expanded position. Embodiment 2 illustrates a bellows assembly 60 with four gussets spaced axially away from each other and an intermediate expansion position that allows for further axial expansion or contraction toward or away from the contracted position. Embodiment 3 illustrates a bellows assembly 60 with four gussets spaced axially adjacent to each other in a contracted position and configured to allow for axial expansion of the bellows assembly 60 toward the extended position.

Figure 3:
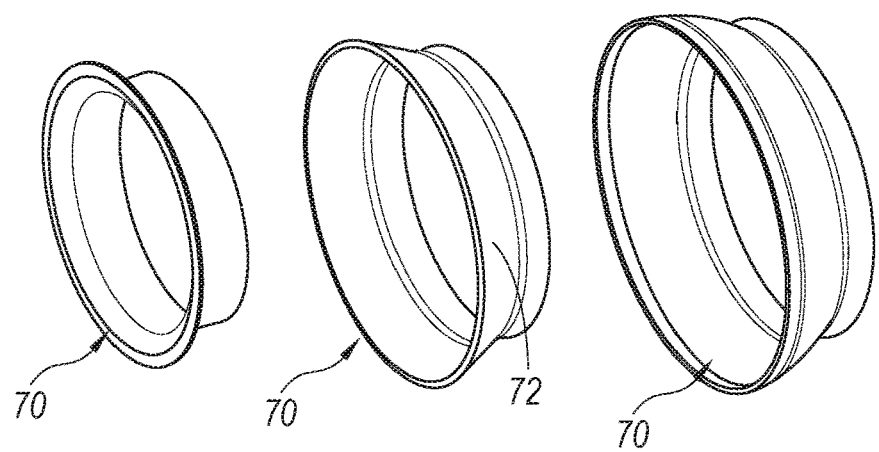
FIG. 3 show isometric views of inner races of the flexible joint assemblies of FIG. 1.

FIG. 3 illustrates isometric views of inner races 70 shown removed from the flexible joint assemblies 10. The inner races 70 are made of Nickel alloy 718 sheet with a thickness in the range of approximately 0.050"-0.125", inclusive. Other embodiments can use other suitable materials and or other dimensions. The inner races 70 can have different internal diameter shapes and external diameter shapes and configurations that mate with the end portions 64 of the bellows assembly 60 and/or the distal end portion 24 of the corresponding standoff (FIG. 1)

Figure 4:
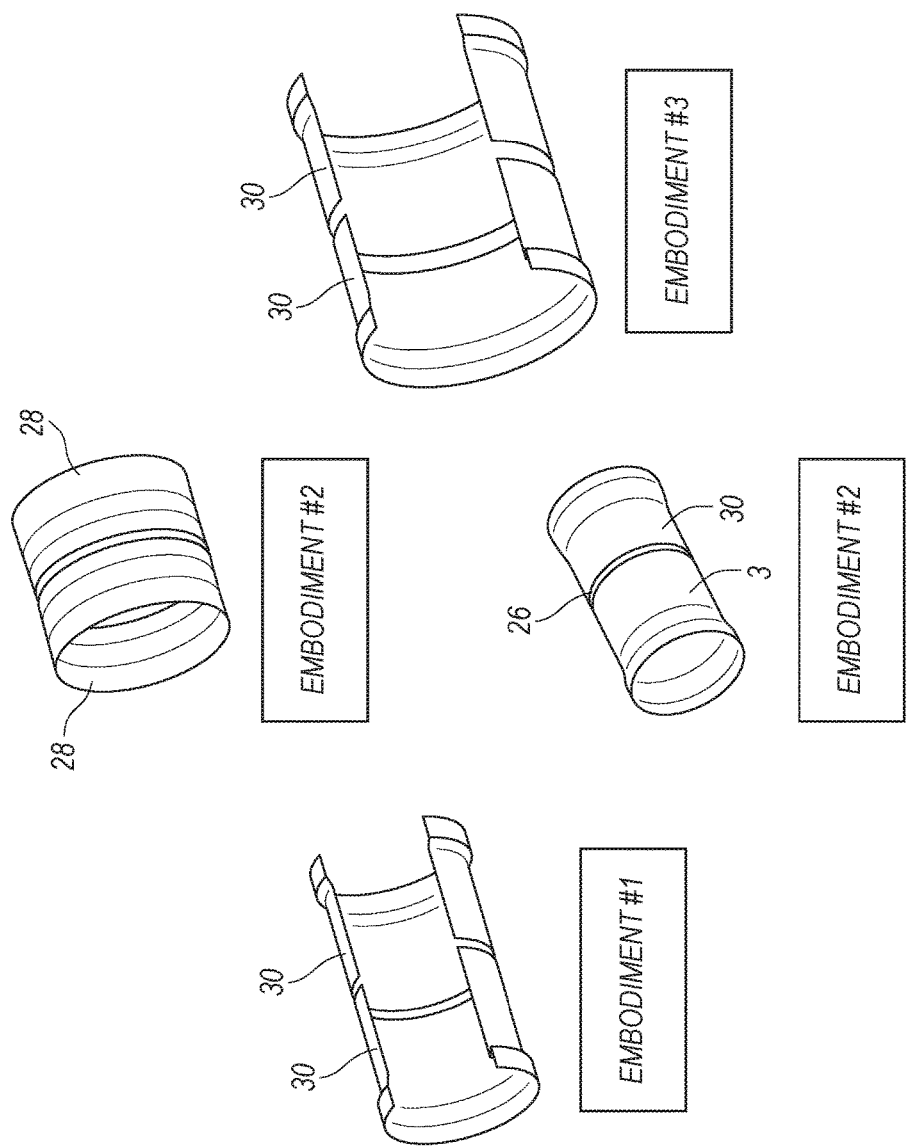
FIG. 4 show isometric views of flow liners of the flexible joint assemblies of FIG. 1.

FIG. 4 illustrates isometric views of the inner flow liners 30 shown removed from the flexible joint assemblies 10. The liners 30 are made of Nickel alloy 625 sheet with a thickness in the range of approximately 0.020"-0.032", inclusive. Other embodiments can use other suitable materials and or other dimensions. The inner flow liners 30 define the innermost surface of the assembly that is in contact with the gas or other fluid flowing through the joint assembly 10. It is desirable that the inner flow liners 30 have a substantially constant inner diameter that mates at least fairly closely with the tubes connected to opposing sides of the joint assembly 10.

Figure 5:
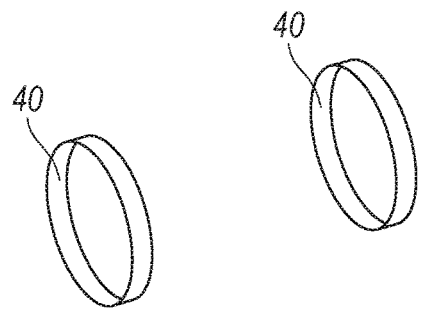
FIG. 5 show isometric views of bands of the flexible joint assemblies of FIG. 1.

FIG. 5 illustrates isometric views of the bands 40 shown removed from the flexible joint assemblies 10. The bands 40 are made of Nickel alloy 625 sheet with a thickness of approximately 0.040". Other embodiments can use other suitable materials and or other dimensions. The bands 40 have an inner diameter substantially similar to the inner diameter of the inner flow liner two define a smooth inner surface through the joint assembly 10.

Figure 6:
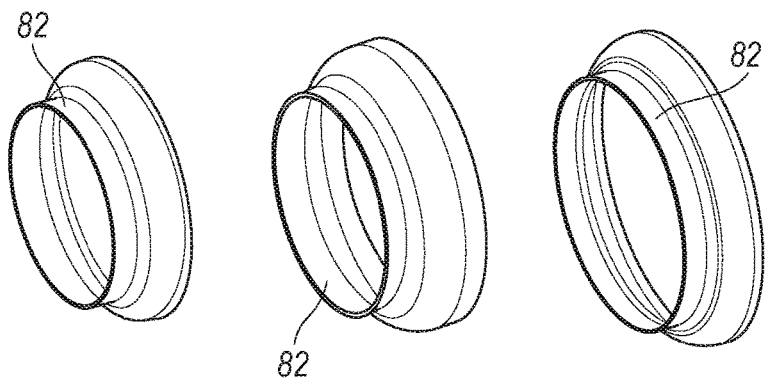
FIG. 6 show isometric views of support collars of the flexible joint assemblies of FIG. 1.
Figure 7:
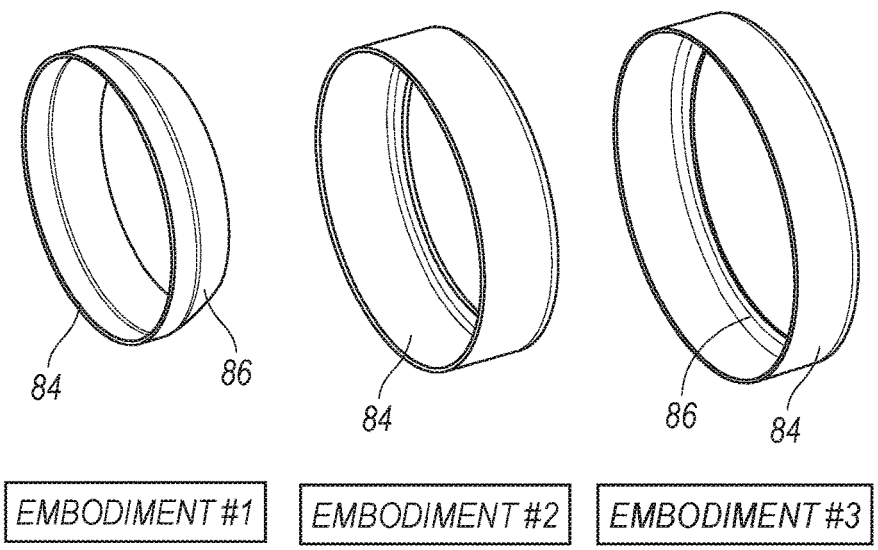
FIG. 7 show isometric views of outer races of the flexible joint assemblies of FIG. 1.
Figure 8:
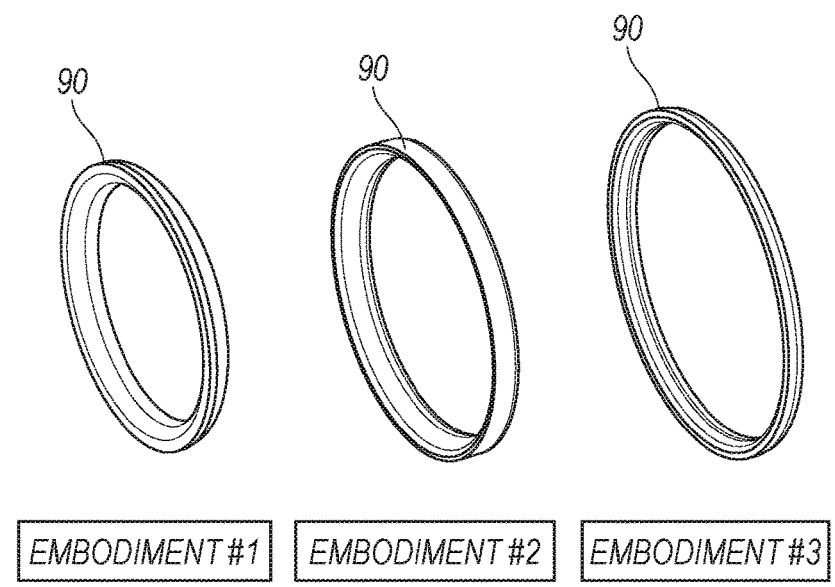
FIG. 8 show isometric views of self-lubricating graphite bearings of the flexible joint assemblies of FIG. 1.

FIG. 6 illustrates isometric views of the support collars 82 of the outer races 80 shown removed from the embodiments of the flexible joint assembly 10. The outer races 80 are made of Nickel alloy 718 sheet with a thickness in the range of approximately 0.050"-0.100", inclusive. Other embodiments can use other suitable materials and or other dimensions. The distal portion of the outer races 80 incorporated within the embodiments of the flexible joint assembly 10 are shown in FIG. 7. The outer races 80 are made of Nickel alloy 718 sheet with a thickness in the range of approximately 0.050"-0.125", inclusive. Other embodiments can use other suitable materials and or other dimensions. The bearings 90 incorporated within the embodiments of the flexible joint assembly 10 are shown in FIG. 8, below. The bearings are made of graphite or other suitable material.

Figure 9:
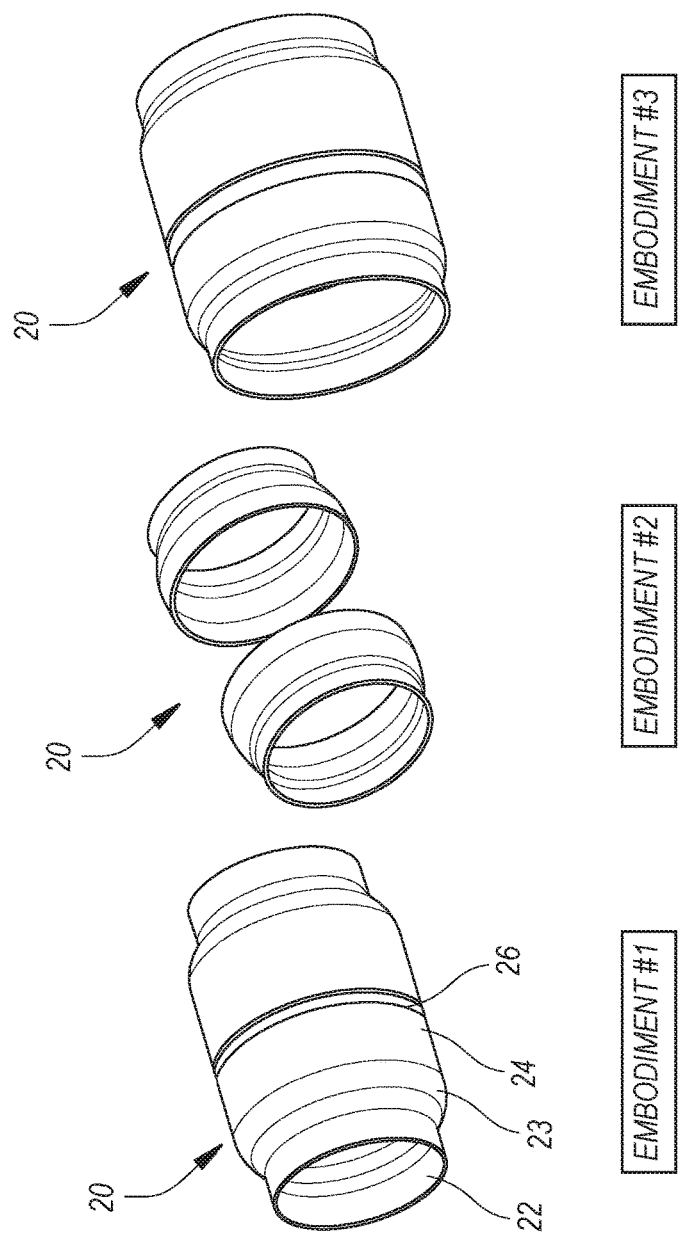
FIG. 9 show isometric views of standoffs of the flexible joint assemblies of FIG. 1.
Figure 10:
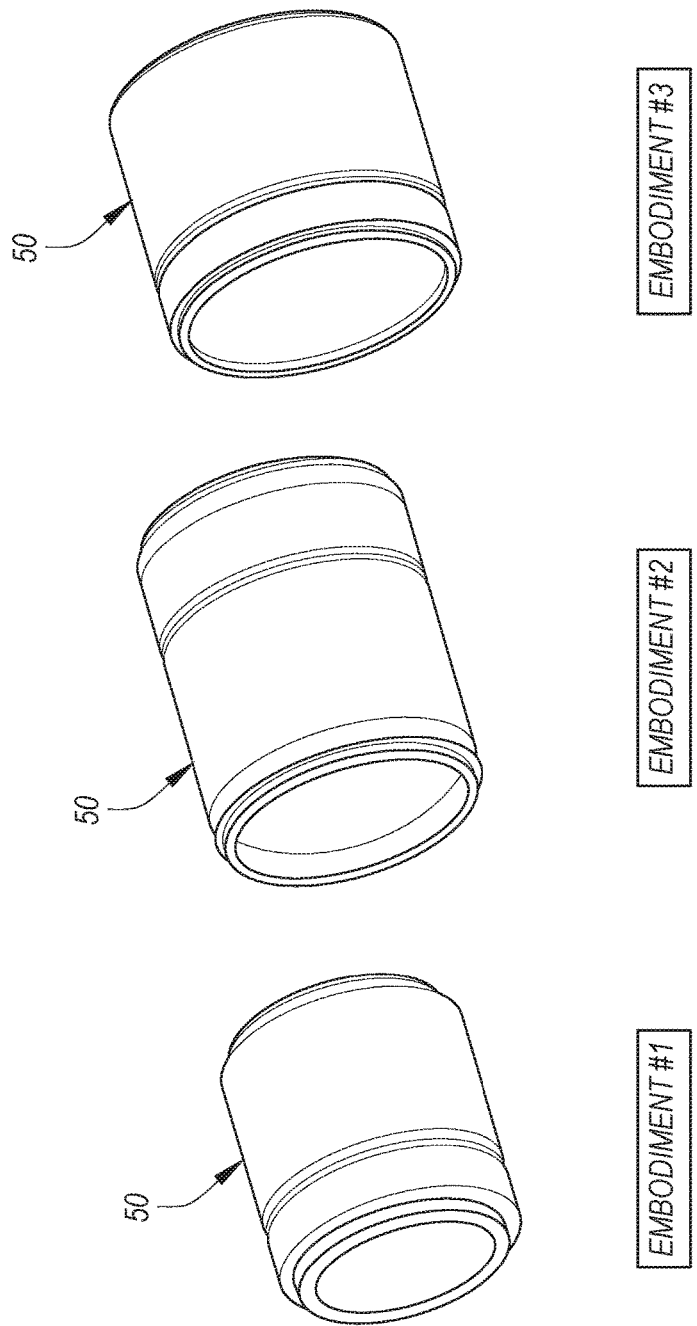
FIG. 10 show isometric views of insulation layers of the flexible joint assemblies of FIG. 1.

The standoffs 20 incorporated within the embodiments of the flexible joint assembly 20 are shown in FIG. 9. The standoffs 20 are made of Nickel alloy 625 or 718 sheet with a thickness in the range of approximately 0.050"-0.080", inclusive. Other embodiments can use other suitable materials and or other dimensions. The insulation layers 50 incorporated within the embodiments of the flexible joint assembly 10 are shown in FIG. 10. The insulation is made of microporous silica blankets (ref. Mm-K®) with a thickness in the range of approximately 0.1875"-0.250" a density of approximately 8 pcf. Other embodiments can use other suitable materials and or other dimensions.

Figure 11:
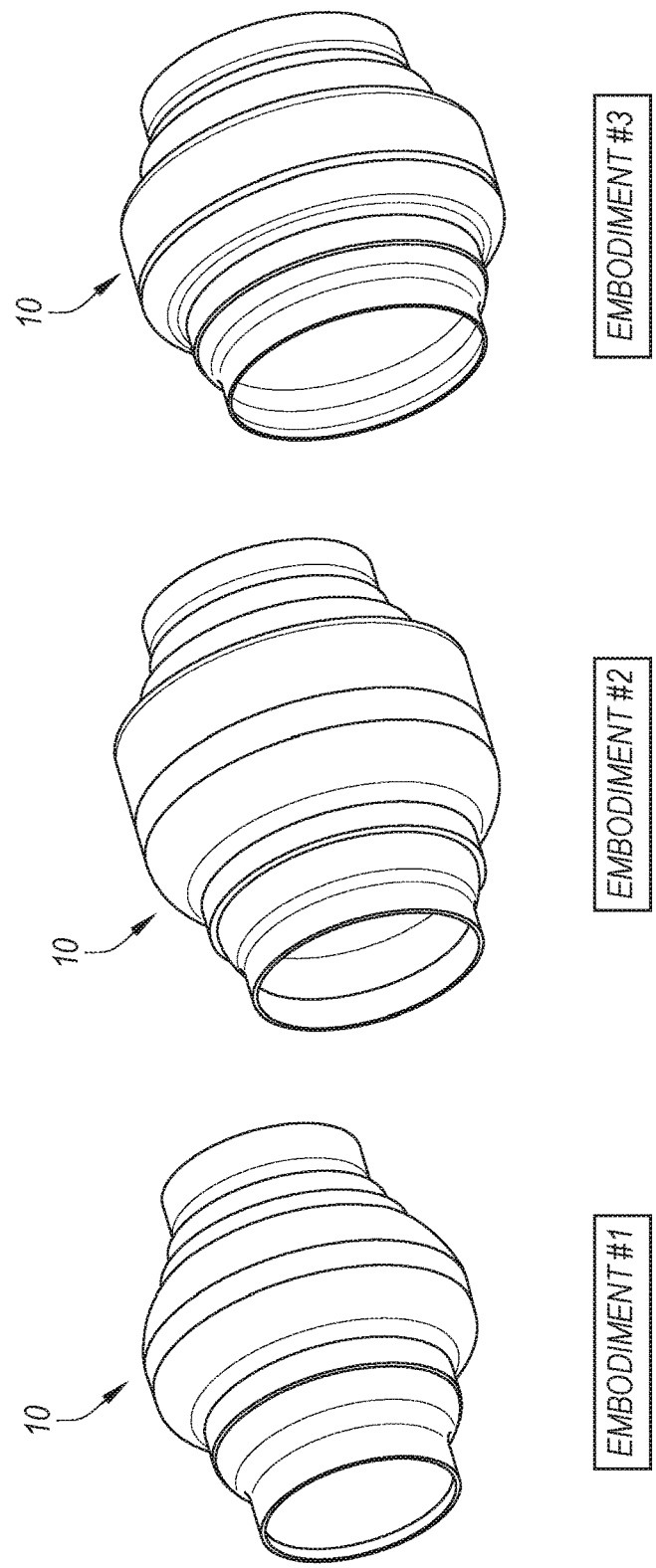
FIG. 11 show isometric views of the assembled flexible joint assemblies of FIG. 1.

Embodiments of the flexible joint assembly 10 are shown in FIG. 11. The illustrated embodiments each comprise the bellows assemblies, inner and outer races or retainers, liners or bands, support collars, bearings, standoffs, and insulation assembled to provide a leak free, flexible assembly with an exterior surface less than the temperature of the air, gas or other fluid flowing therethrough. One end of the respective bellows assemblies is welded to the inner races (or to the outer liner for Embodiment #2) and to a standoff. The other end of the bellows assemblies is welded to the support collars, (the other outer liner for Embodiment #2) and the other standoff. Two individual plies of insulation are installed, and the remaining liners and/or bands are welded to the standoffs. The bearings are then installed, and the outer race or retainers are welded to the sub-assemblies. In other embodiments, the manufacturing steps may occur in a different sequence, and may include more or fewer steps.

Figure 12:
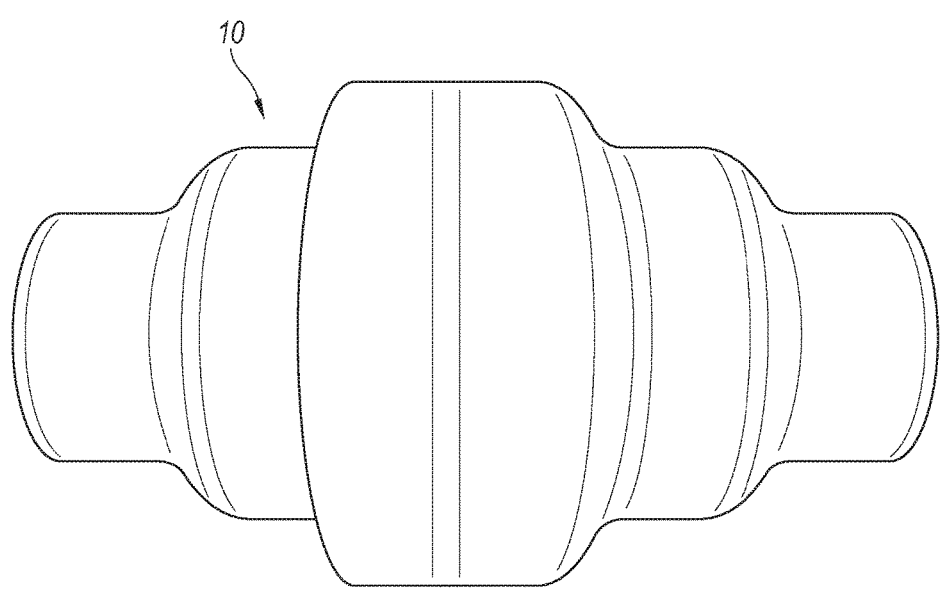
FIG. 12 is a side elevation view of a flexible joint assembly used for testing.

The flexible joint assemblies 10 of the illustrated embodiments discussed above are configured for at least one operational design condition where the internal temperature required is approximately 1400° F. It was determined that, for extended exposure above 1200° F., the Nickel alloy 718 components, including the bellows, may experience over-aging due to a change in microstructure that may decrease ductility and creep strength, and could lead to embrittlement. The boundary of insulation radially inward of the bellows and the graphite bearings keeps the Nickel alloy components at a lower temperature over extended exposure to high temperature air, gas or other fluid flowing through the joint assembly. It is preferable for at least one embodiment that the graphite bearing should be below 1100° F. intermittent and 1000° F. continuous. A tested flexible joint assembly with two plies of 3/16" thick Min-K insulation blankets is shown below in FIG. 12.

Figure 13B:
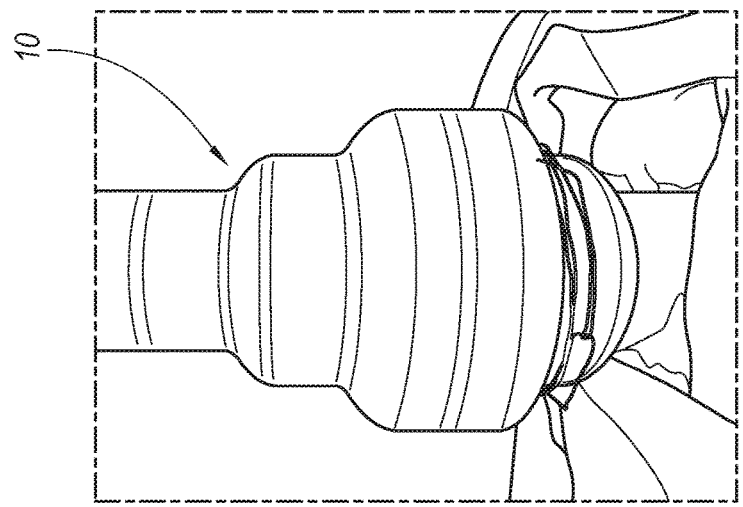
FIG. 13 show photographs of the flexible joint assembly of FIG. 12 during endurance cycle testing.
Figure 13A:
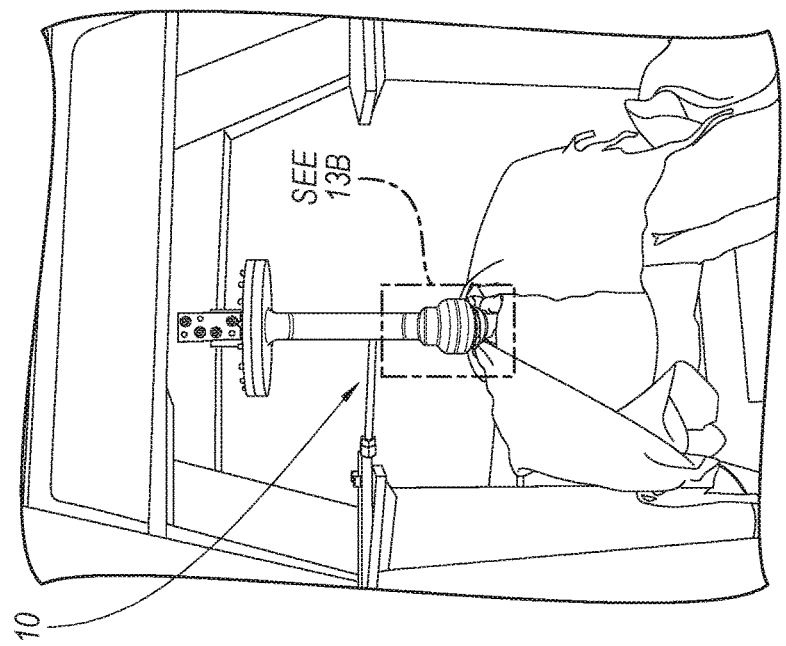

The flexible joint assembly 10 was installed into a heated/pressurized endurance cycle test set-up shown in FIG. 13 and run in accordance with a qualification endurance cycle test, which a progression through the following steps 1-5, which comprise one test cycle: Step 1—Heat the flexible joint to 1000° F. using a hot air supply system; Step 2—Pressurize the flexible joint to 50 psig; Step 3—Angulate the flexible joint to +5°; Step 4—Return the flexible joint to a neutral angle; and Step 5—Vent the flexible joint pressure back to ambient. One thousand cycles were completed with the first two cycles pressurized to 700 psig and the next few cycles pressurized to 450 psig. A pressure test at 736 psig and 1000° F. was also performed without evidence of degradation of flexible joint performance. No degradation of the flexible joint insulation blankets or evidence of blanket wear was observed after pressure/deflection cycles and pressure testing was completed.

Figure 14:
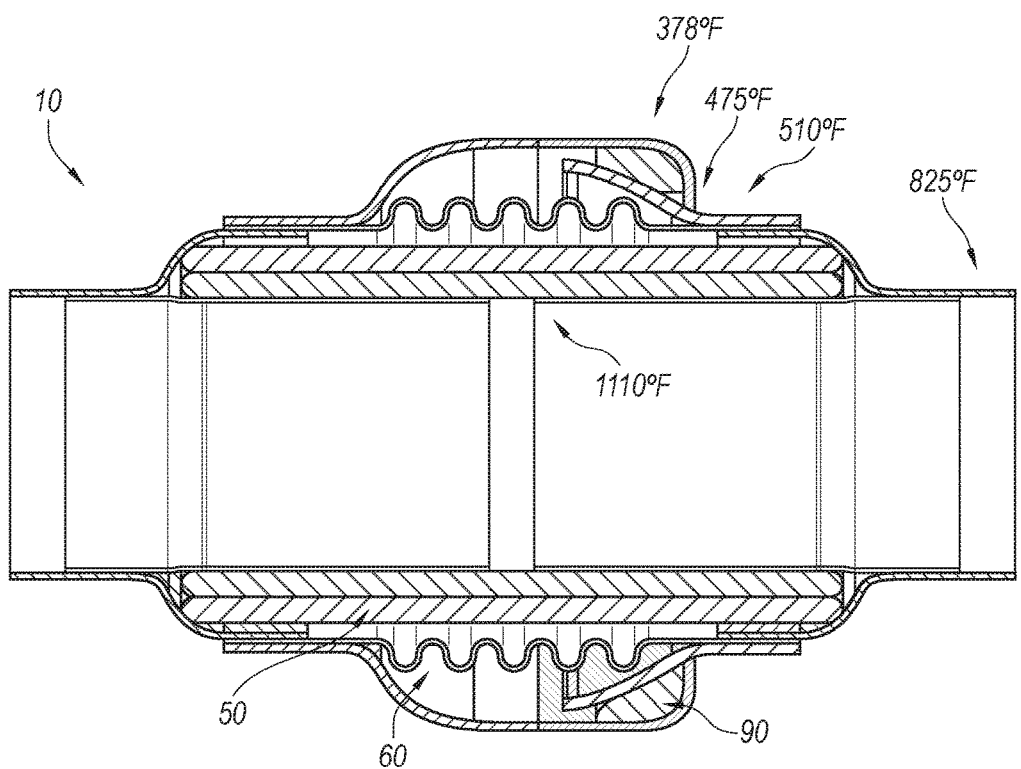
FIG. 14 is a schematic cross-sectional view of a flexible joint assembly with associated temperature data.
Figure 15:
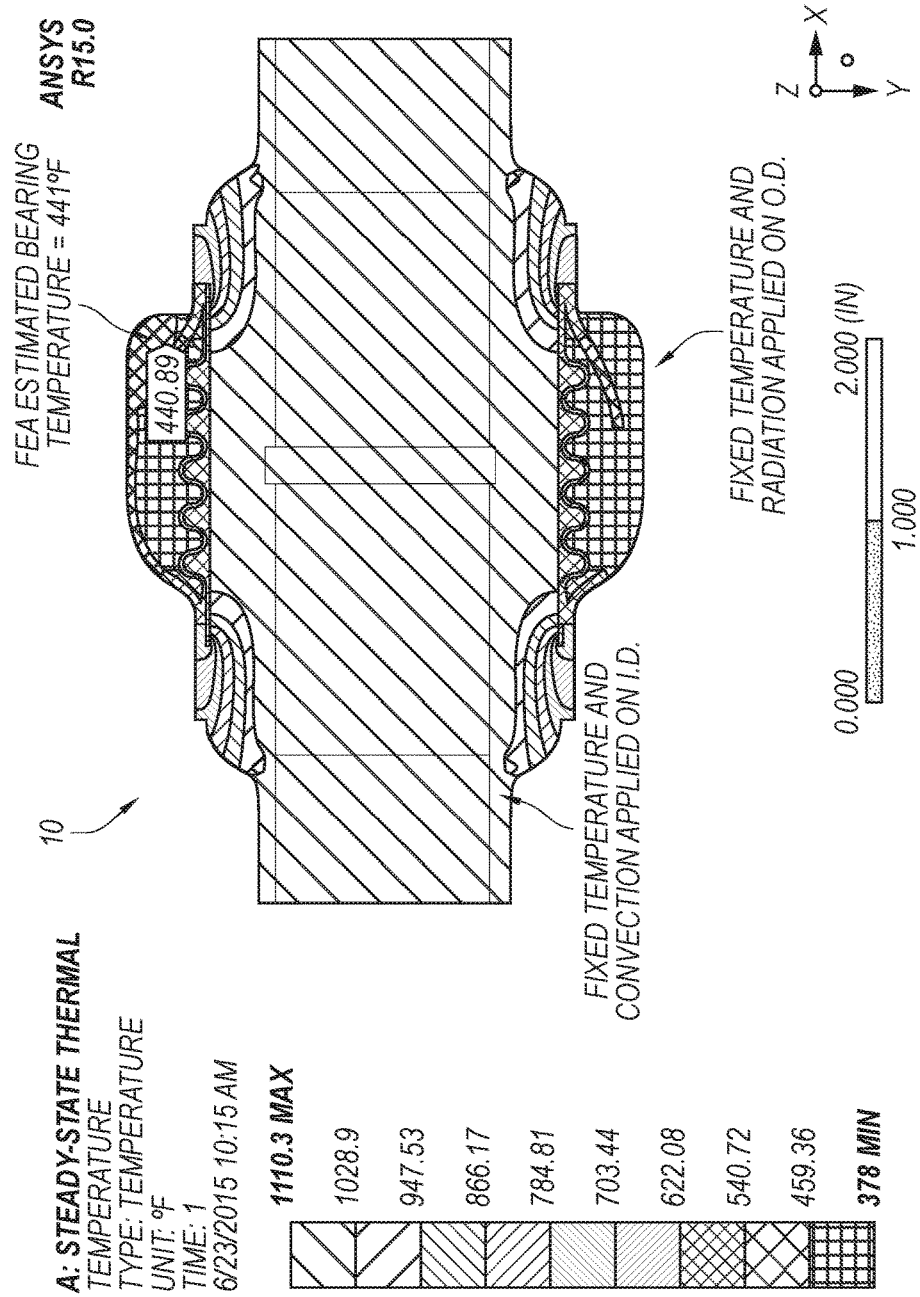
FIG. 15 is a schematic cross-sectional view of a flexible joint assembly with associated temperature data in accordance with a finite element analysis.

During testing, thermocouple temperature readings shown in FIG. 14 were collected at various points on the flexible joint assembly when it was statically located in the endurance cycle test machine. FIG. 15 illustrates temperature distribution in the flexible Assembly in accordance with a steady state thermal Finite Element Analysis (FEA). With a measured internal temperature of 1110° F. applied to the model, the analysis shows the bearing to be at 441° F., which correlates well with the development thermal test results.

Figure 16:
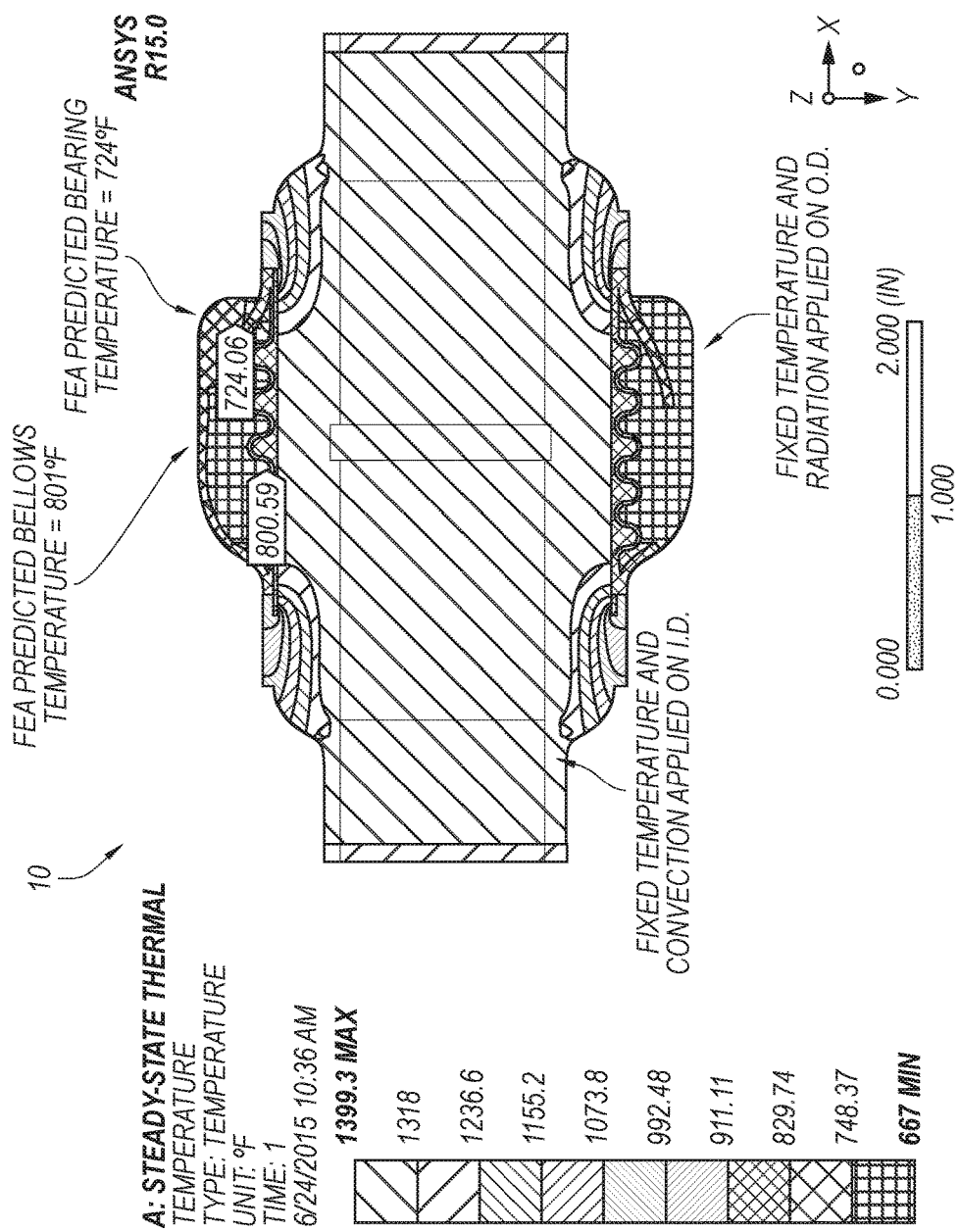
FIG. 16 is a schematic cross-sectional view of a flexible joint assembly with associated temperature data in accordance with a finite element analysis.

In the illustrated embodiment shown in FIG. 16, wherein the measured internal temperature was approximately 1400° F., the temperature profile provided a maximum bellows temperature of 801° F. and a maximum bearing temperature of 724° F. The temperature of the graphite bearing will be below 1000° F. and the bellows below 1200° F. for an internal temperature of 1399° F. for the embodiments of the flexible joint assemblies disclosed herein.

The flexible joint assemblies in accordance with the illustrated embodiments incorporate an external bearing include self-lubricating graphite bearings that offer consistent low bending moments and excellent resistance to wear. Graphite bearings also provide a greater cycle life than flexible joints using coated metallic races, and have lower weight and are less expensive than gimbal joints. The external bearing design places the bearing on the outside of the inner race detail. This configuration separates the bearing from the duct body in order to reduce the effective temperature to which the bearing is exposed. The design also improves the load carrying characteristics of the flexible joint when compared to internal bearings. This configuration is typically used when duct temperatures or pressures approach or exceed the capabilities of an internal bearing joint but are low enough to accommodate the external bearing design.

Other embodiments, the flexible joint assemblies can incorporate an internal bearing and comprise flow liners, bellows, a retainer, an outer race, a support collar, and a graphite bearing. Internal bearings are similar to external bearing configurations in function but offer a slightly more compact envelope and reduced cost of manufacturing. The bearing position also increases the bearing exposure to the ducted gas temperature and thus lowers the maximum operating temperature for the flexible joint (relative to an external bearing joint). Because of this, internal bearings are usually chosen over external bearings when the duct operating temperatures are below the oxidation limits of the bearing (around 1100° F.).

Other embodiments, the flexible joint assemblies using sheet metals races consist of flow liners, bellows, an inner race, an outer race, a support collar, and in some circumstances a guide detail. The guide detail is only included when unpressurized minimum bending moment requirements are higher than that which is generated by the bellows compression alone. Flexible joints using sheet metal races are capable of higher operational temperatures than graphite bearing joints and are significantly less expensive than gimbal joints. The coating on the sheet-metal races is expected to wear with cyclic bending moments over time, and thereby increase friction in the flexible joint. This friction may lead to an increase in the maximum bending moment beyond the selected parameters.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A flexible joint assembly configured to interconnect tube segments of an extreme temperature gas flow system, the assembly comprising:
   a pair of opposing standoffs axially spaced apart and separated from each other axially by a gap, each standoff having proximal and distal end portions, and the proximal end portion of each standoff being connectable to a respective one of the tube segments;
   a pair of inner flow liners each coaxially aligned with and coupled to the proximal end portion of a respective one of the standoffs, each inner flow liner being radially inward of and separated from at least a portion of the respective standoff to define an annular space therebetween;
   insulation in the annular space between each inner flow liner and the respective one of the standoffs;
   a bellows member coupled to each standoff and spanning the gap between the opposing standoffs, the bellows member configured to allow the pair of standoffs to move angularly relative to each other relative to a longitudinal axis of the assembly;
   an inner race coupled to a first one of the standoffs adjacent to a first end portion of the bellows member;
   an outer race coupled to a second one of the standoffs adjacent to a second end portion of the bellows member;
   wherein at least one of the inner and outer races having an arcuate bearing surface; and
   a bearing portion between the inner and outer races and configured to engage the bearing surface at least when the first and second standoffs move angularly relative to each other.

2. The assembly of claim 1 wherein the insulation spans the gap between the opposing standoffs.

3. The assembly of claim 1 wherein the insulation comprises a plurality of insulation layers.

4. The assembly of claim 1 wherein the bellows assembly covers at least a portion of the insulation.

5. The assembly of claim 1 wherein the inner flow liner is attached to the proximal end portion of each standoff.

6. The assembly of claim 1, further comprising a support band positioned within the inner flow liner at the proximal end portion of the standoff.

7. The assembly of claim 1 wherein the bellows assembly comprises a gusseted portion configured to allow the first and second standoffs to move angularly relative to each other through a range approximately +/−5 degrees.

8. The assembly of claim 1 wherein the outer race further comprises a retainer portion engaging the bearing and retaining the bearing in engagement with the bearing surface.

9. The assembly of claim 1 wherein the bearing is a self-lubricating ring.

10. The assembly of claim 1 wherein each inner flow liner has a first end portion coupled to the proximal end portion of the respective one of the standoffs and a second end portion radially inward of the distal end portion of the respective one of the standoffs, the first end portion having a first diameter larger than a second diameter of the second end portion.

11. The assembly of claim 1 wherein the bellows member has a first end portion captured between the outer race and a first one of the standoffs, and the bellows member has a second end portion captured between the inner race and a second one of the standoffs.

12. The assembly of claim 1 wherein the arcuate bearing surface is a partially spherical bearing surface.

13. A flexible joint assembly, comprising:
   a pair of opposing standoffs axially spaced apart and separated from each other by a gap, each standoff being connectable to a respective one of the tube segments;
   a pair of inner flow liners each coaxially aligned with and coupled to a respective one of the standoffs;
   insulation between at least a portion of each inner flow liner and the respective one of the standoffs;
   a bellows member coupled to each standoff and spanning the gap between the opposing standoffs, the bellows member configured to allow the pair of standoffs to move angularly relative to each other and relative to a longitudinal axis of the assembly;
   an inner race coupled to a first one of the standoffs adjacent to a first end portion of the bellows member;
   an outer race coupled to a second one of the standoffs adjacent to a second end portion of the bellows member;
   wherein at least one of the inner and outer races having an arcuate bearing surface; and
   a bearing between the inner and outer races and in engagement with the bearing surface at least when the first and second standoffs move angularly relative to each other.

14. The assembly of claim 13 wherein the bellows assembly covers at least a portion of the insulation.

15. The assembly of claim 13 wherein the inner flow liner is fixedly attached to the proximal end portion of each standoff.

16. The assembly of claim 13 wherein the bellows assembly comprises a gusseted portion configured to allow the first and second standoffs to move angularly relative to each other through a range approximately +/−5 degrees.

17. The assembly of claim 13 wherein the outer race further comprises a retainer portion engaging the bearing and retaining the bearing in engagement with the bearing surface.

18. The assembly of claim 13 wherein the arcuate bearing surface is a partially spherical bearing surface.

19. A flexible joint assembly configured to interconnect first and second gas lines of a high temperature-gas flow system, the assembly comprising:
   tubular first and second standoffs axially spaced apart from each other and each having distal and proximal end portions, the distal end portions generally facing each other and forming an axial gap between the standoffs, the proximal end portion of the first standoff configured to connect to the first gas line, and the proximal end of the second standoff configured to connect to the second gas line, each standoff further comprising radial interior and exterior surfaces, the first and second standoffs being movable angularly relative to each other;

a first inner flow liner fixedly attached to the proximal end portion of the first standoff, and a second inner flow liner fixedly attached to the proximal end portion of the second standoff, the first and second inner flow liners being axially adjacent to each other with an annular space between the first and second inner flow liners and the distal end portions of the first and second standoffs;

one or more insulation layers in the annular space and spanning the axial gap between the first and second standoffs;

a bellows member connected to the first and second standoffs, the bellows member spanning the axial gap between the first and second standoffs and positioned adjacent to at least a portion of the one or more insulation layers;

an annular inner race attached to a first end of the bellows assembly or to the first standoff, the inner race having a first bearing surface facing radially away from the bellows assembly;

an outer race attached to the second end of the bellows assembly or to the second standoff, the outer race having a second bearing surface facing radially toward the first bearing surface of the inner race; and a bearing between the first and second bearing surfaces, the bearing slidably engaged with at least one of the first or second bearing surfaces of the outer and inner races when the first and second standoffs move angularly relative to each other.

20. The assembly of claim 19 wherein the bearing surface is partially spherical.

* * * * *